US008819621B2

(12) United States Patent
Naik et al.

(10) Patent No.: US 8,819,621 B2
(45) Date of Patent: Aug. 26, 2014

(54) SYSTEM AND METHOD FOR AUTOMATED RE-ARCHITECTUREING OF LEGACY SYSTEMS USING OBJECT ORIENTED LANGUAGE

(75) Inventors: Ravindra Naik, Mumbai (IN); Amit Saxena, Mumbai (IN); Narayan Ramaswami, Mumbai (IN); Thirthahalli Shivaprasad, Mumbai (IN)

(73) Assignee: Tata Consultancy Services, Mumbai (IN)

( * ) Notice: Subject to any disclaimer, the term of this patent is extended or adjusted under 35 U.S.C. 154(b) by 1192 days.

(21) Appl. No.: 12/298,528

(22) Filed: Oct. 25, 2008

(65) Prior Publication Data

US 2011/0035725 A9   Feb. 10, 2011

Related U.S. Application Data

(63) Continuation of application No. PCT/IN2007/000170, filed on Apr. 26, 2007.

(30) Foreign Application Priority Data

Apr. 26, 2006   (IN) .......................... 655/MUM/2006

(51) Int. Cl.
   *G06F 9/44*   (2006.01)
(52) U.S. Cl.
   USPC ........................... 717/106; 717/114; 717/116
(58) Field of Classification Search
   None
   See application file for complete search history.

(56) References Cited

U.S. PATENT DOCUMENTS

| | | | |
|---|---|---|---|
| 6,018,627 A | 1/2000 | Iyengar et al. | |
| 6,247,172 B1 | 6/2001 | Dunn et al. | |
| 6,334,215 B1 | 12/2001 | Barker et al. | |
| 6,389,385 B1 | 5/2002 | King | |
| 6,389,588 B1 | 5/2002 | Wadhwa et al. | |
| 6,453,464 B1 | 9/2002 | Sullivan | |
| 6,467,079 B1 | 10/2002 | Ettritch et al. | |
| 2003/0074648 A1* | 4/2003 | Brassard et al. | 717/104 |
| 2004/0158820 A1 | 8/2004 | Moore et al. | |
| 2005/0138603 A1 | 6/2005 | Cha et al. | |
| 2006/0265696 A1* | 11/2006 | Mayfield et al. | 717/137 |

OTHER PUBLICATIONS

Lano et al., "Mapping Procedural Patterns to Object Oriented Design Patterns," Automated Software Engineering, Kluwer Academic Publishers, BO, vol. 6, Jan. 1, 1999, pp. 265-289.
Sneed et al. "Architecture and Functions of a Commercial Software Re-enginnering Workbench," Mar. 1, 1998, Software Maintenance and Reengineering, 1998. Proceedings of the Secon D Euromicro Conference on Florence, Italy Mar. 8-11, 1998, Los Alamitos, CA, USA,IEEE Comput. Soc, US, pp. 1-9.
Newcomb et al.: 'Automated Transformation of Legacy Systems' Crosstalk the Journal of Defense Software Engineering Dec. 2003, pp. 18-22.
Knodel et al: "An Efficient Migration to Model-driven Development (MDD)" Electronic Notes in Theoretical Computer Science, Elsevier, vol. 137, No. 3, Sep. 8, 2005, pp. 17-27.

(Continued)

*Primary Examiner* — Qamrun Nahar
(74) *Attorney, Agent, or Firm* — Akerman LLP; Peter A. Chiabotti; Roy P. Zachariah

(57) ABSTRACT

The present invention relates to method of defining multiple program abstractions, extraction methodologies, transformation, and code conversion to convert legacy monolithic architecture of business systems to a layered modern architecture using Object Oriented language such as Java.

15 Claims, 5 Drawing Sheets

(56) References Cited

OTHER PUBLICATIONS

Stroulia E et al: "From legacy to Web through interaction modeling" Proceedings IEEE International Conference on Software Maintenance. ICSM-2002. Montreal, Quebec, Canada, Oct. 3-6, 2002; [IEEE International Conference on Software Maintenance], Los Alamitos, CA : IEEE Comp. Soc, US, Oct. 3, 2002, pp. 320-329.

Niere J et al: "Handling large search space in pattern-based reverse engineering" Program Comprehension, 2003. 11th IEEE International Workshop on May 10-11, 2003, Piscataway, NJ, USA,IEEE, May 10, 2003, pp. 274-279.

Heuzeroth D et al: "Automatic design pattern detection" Program Comprehension, 2003. 11th IEEE International Workshop on May 10-11, 2003, Piscataway, NJ, USA,IEEE, May 10, 2003, pp. 94-103.

Wei Wang et al: "Design Pattern Detection in Eiffel Systems" Reverse Engineering, 12th Working Conference on Pittsburgh, PA, USA Nov. 7-11, 2005, Piscataway, NJ, USA,IEEE, Nov. 7, 2005, pp. 165-174.

Masiero P C et al: "Legacy systems reengineering using software patterns" Computer Science Society, 1999. Proceedings. SCCC '99. XIX International Conference of the Chilean Talca, Chile Nov. 11-13, 1999, Los Alamitos, CA, USA,IEEE Comput. Soc, US, Nov. 11, 1999, pp. 160-169.

Lano K et al: "Reeingineering legacy applications using design patterns" Software Technology and Engineering Practice, 1997. Proceedings., Eighth IEEE International Workshop on Incorporating Computer Aided Software Engineering London, UK Jul. 14-18, 1997, Los Alamitos, CA, USA,IEEE Comput. Soc, US, Jul. 14, 1997, pp. 326-338.

\* cited by examiner

SYSTEM AND METHOD FOR AUTOMATED RE-ARCHITECTUREING OF LEGACY SYSTEMS USING OBJECT ORIENTED LANGUAGE

FIELD OF THE INVENTION

The present invention relates to an automated re-architecting of legacy systems using object-oriented language.

The present invention relates to method of defining multiple program abstractions, extraction methodologies, transformation, and code conversion to convert legacy monolithic architecture of business systems to a layered modern architecture using Object Oriented language such as Java. The term architecture is used to signify the, static structure of the system and can be related to technical architecture as commonly known in the software world. The term "re-architecting" specifies the modification of architecture of the business systems into different architecture implicitly indicating the protection of the functionality of the system while performing the re-architecting.

This automated re-architecting is achieved by recognizing instances of architectural and design patterns, extracting the instances into a repository, optimize these instances and using them for converting/generating target architecture based system using object oriented language.

PRIOR ART

References

U.S. Pat. No. 6,467,079 A computer-implemented method in which report program language is converted to object-oriented source code, such as Java, using the report program language compiler. The object-oriented source code emulates the behaviour of the report program language, such as VARPG. Applications written in RPG are converted to Java and therefore can run on every platform for which a Java virtual machine exists. RPG programmers now have the ability to write internet applications. Java applications and applets can be written in RPG and existing RPG applications can be converted to Java applets. templates having code that is selectable based upon the applicable case. In one implementation, the source language is translated to target language code which is, in turn, compiled by a target language compiler, thereby providing a two-step source language compiler.

U.S. Pat. No. 6,389,385 A safe system and method for reversibly translating source code between unlike character sets, or formats, includes a mapping table of syntactically necessary characters and, possibly, other frequently used characters, for translating source characters from a first format to a second format. A marker character is used to replace other characters in the source code while preserving the original, replaced source characters in a comment file. Upon reverse translating, syntactically necessary characters are translated back into the first format using the mapping table, and marker characters are replaced by original source characters from the comment file.

U.S. Pat. No. 6,389,588 A method of extracting and transforming a business rule which is a self contained section of legacy code focused on the computation of specific business policy includes identifying the business rule. Thereafter, the business rule code is located in the existing program and extracted in human readable code form. New code is generated for a new application for containing the business rule therein, and the new code is integrated into the new application. A system for extracting and transforming such business rules from existing programs such as legacy applications to a new application includes various components for achieving the various noted steps.

U.S. Pat. No. 6,018,627 A programmed computer system includes a set of development tools, each having a format used to store data and code files. The output data from a developmental tool is transformed into a generic format data which is saved in a repository. The repository also contains all output data, application components, and information as to the relationship between the entities and objects stored in the repository. Each tool employed during the development process puts information into the repository and takes information out of the repository. In this way, the system integrates the tools used in different parts of the development process by passing necessary information from one tool to another. Different tools are employed through each of the development stages, legacy integration, enterprise modeling, domain modeling, writing and editing of business logic, generating skeleton code, component building and wrapping and application deployment.

U.S. Pat. No. 6,334,215 A method for migrating legacy applications into a new software product architecture using a functional conversion module located within a system controller. The functional conversion module comprises a migration plan shut off. The functional conversion module further comprises three paths or branches through which a functional request can be routed. Functional requests which are not identified in the migration plan are routed through the first path and the functional request is sent to the pre-existing software and executed as requested. Functional requests identified in the migration plan for which the pre-existing software is in control are routed through the second path, and the functional request is sent to the pre-existing software and executed as received. In the background, the functional request is translated for the new software and sent to the new software and executed. Functional requests identified in the migration plan for which the new software is in control are routed through the third path, and the functional request is translated for the new software and sent to the new software and executed. If the pre-existing software has been shut off, the task is complete. If the pre-existing software is not identified as being shut off, the functional request is sent to the pre-existing software and executed as received in the background. Duplicate requests are suppressed by the system controller.

BACKGROUND OF THE INVENTION

Businesses have invested money, time, and resources in computers and computer systems which store and access large quantities of data relating to specific matters, such as financial accounts, inventory, customers, employees, etc. Businesses are sensitive to the loss of their investment when new computer technology arises which may result in their investments becoming obsolete. An important consideration, therefore, in introducing new computer technology is its adaptation with existing computer technology.

Many organizations are forced to employ the expensive approach of re-writing the software from scratch. This is because there are no techniques that are ably supported by tools to re-architect the legacy software to the chosen open environment and architecture, while making effective use of the features of the new environment.

Modern architecture like Service oriented architecture (SOA), web services are gaining popularity. These architectures provide better re-usability and access within and across the organization. Monolithic Legacy architecture however provides a closed environment and cannot operate with SOA based applications.

Though wrappers can be provided to make old logic into services, the real benefits can be observed where Legacy architecture is migrated to modern SOA architecture.

Object-oriented" programming (OOP) is gaining popularity as it provides benefits over procedural programming. OOP languages, such as Smalltalk, C++, and Java, allow programmers to approach their programming tasks in a way that is believed to be more natural and intuitive than the rigidity of the procedural programming languages. The main problem, however, is that an OO architecture does not inherently interface smoothly with architecture of Legacy systems in which businesses may have a substantial investment.

Therefore there is a dire need to develop a system which provides easier conversion path to utilize new architecture and that has a flexible and a smooth interface. The present invention aims at developing such system.

The goal of OOP is to reduce the time and costs associated with developing complex software by creating small, reusable sections of program code that can be quickly and easily combined and reused to create new programs. The code sections are known as objects. The software object may model the attributes or characteristics of the real-world object and, in many cases, may also model its behavior.

Despite the recent development of modern architecture like SOA and dedicated OOP languages, businesses can't take the benefits of these state of the art practices since they have already invested billions of dollars over the years in their existing systems and procedural code. It would be an extraordinarily uneconomical task to manually transfer all legacy procedural codes into OOP codes following modern architecture. It is a known-to-be-difficult problem. Obsolete documentation, core programmers are no longer available and the structure of the system is not known, are some of the main reasons. The known techniques of syntactic (one-to-one) conversion (as claimed in U.S. Pat. No. 6,467,079 and U.S. Pat. No. 6,453,464) are not suitable since they do not result in architectural modifications to take the real benefits.

It is the object of the invention to provide a method and system that can re-architect the legacy code in an automated fashion. This automated re-architecting is achieved by recognizing instances of architectural and design patterns, identifying instances and using these instances for generating/transforming to object oriented code.

It is the object of the invention to establish and define architectural and design patterns, taking into account the variants of programming languages and styles.

It is yet another object of the invention to establish criteria to generate or convert the existing legacy code into OO code based on multiple patterns.

It is yet another object of the invention to link the converted instances of the patterns to build a functionally equivalent re-architected application.

It is yet another object of the invention to migrate legacy programs irrespective of the platforms.

SUMMARY OF THE INVENTION

The invention is directed to a method and system of defining patterns for identifying various abstractions in legacy systems, and transforming the legacy system, based on the identified instances of patterns, into a new system following modern layered architecture using object oriented language.

The present invention addresses the problem of re-architecting by defining abstractions that are based on the architectural and design aspects. By recognizing occurrences of such patterns in the legacy code, the implicit architecture and design may be recovered.

The present invention aims at defining appropriate abstractions, and assists architecture and design recovery by tool based recognition of the patterns in the legacy programs. Using domain and context knowledge to parameterize the extraction algorithms, the present invention maps the program elements to pre-defined, open architecture patterns.

The present invention also addresses the conversion of the pattern instances into modern object-oriented implementation.

BRIEF DESCRIPTION OF THE DRAWINGS

FIG. 1 describes the method and system of re-architecting the legacy systems into modern architecture using object oriented language. First a pattern definitions repository (1) is prepared that includes definition of various patterns including services (2), validations (3), data access (4), data entities (5), user message (6), user interface (7), and data definition (8). These patterns are specified (9) in a workbench (12) for creating individual pattern matchers (16) corresponding to each pattern, to identify the occurrence of the pattern in the legacy system (13). Programming language syntax (11) and known programming styles (10) of the legacy system are used to specify (9) these patterns using specification language into the workbench (12) to generate pattern matchers (16).

Figure 1:
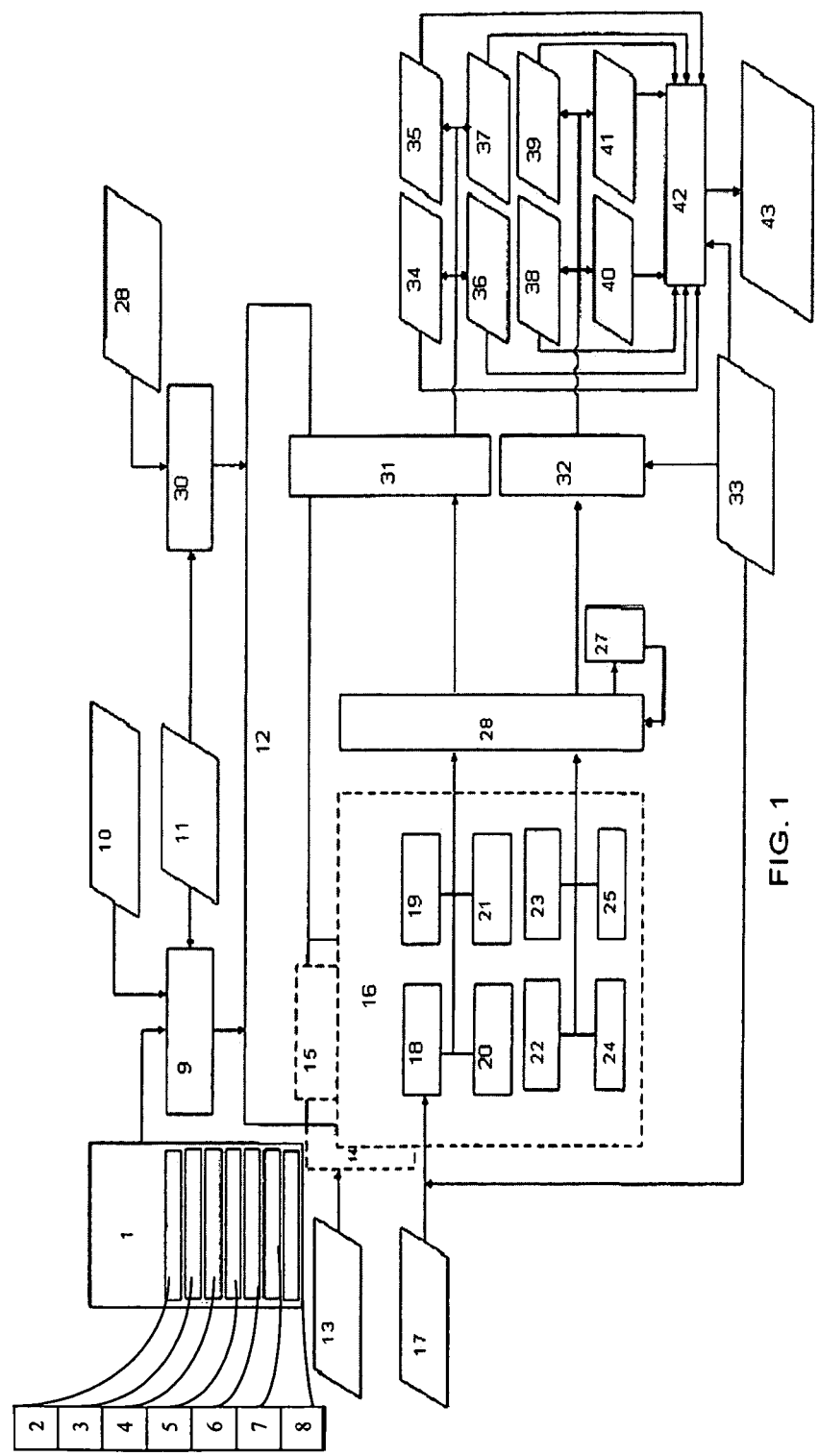
FIG. 1 describes the method and system for automated re-architecting of legacy systems using object-oriented language.

The legacy system (13) is parsed using a language specific parser (14), control flow analysis and data flow analysis is performed using program analyzer (15). A modern architecture is finalized as the target architecture (33) for the re-architecting. This architecture decides the kinds of different classes, which will be present in the re-architected application. As a first step of the pattern matching, the data entity matcher (18) traverses through the legacy program and captures all the information about all the data entities used in the program to create and map to the corresponding classes.

Multiple pattern matchers extract the user interface (24), user messages (22), data definitions (25) and data access (23). Service pattern matcher (20) identifies services in legacy application and validation pattern matcher (19) identifies validations in the legacy application. Computation pattern matcher (21) identifies all program statements that are part of the computations. After pattern matching is completed, the different pattern instances are available, which are stored in the pattern instance repository (26). There is an optional step of optimization (27), which is performed on the extracted pattern instances to optimize the output extracted from the pattern matchers (16). For the conversion of extracted pattern instances (26) a conversion rules specification (30) is prepared with the mapping of legacy language (11) and object-oriented language (28) and specified into the workbench (12) to create the converter tool (31). The user interface (40) and user message classes (38) are generated using the code generator (32). Data definitions (41) and data access classes (39) are generated by the code generator (32). Methods converted from legacy system are added into Service classes (34) and Domain classes (35). Validation methods (37) converted from legacy system are added to the domain classes (35). All other data entities are generated as classes (36) in the re-architected application.

All the application elements of the system are integrated using the packager (42) as per the definition of the target architecture (33) to create the re-architected system (43).

Figure 2:
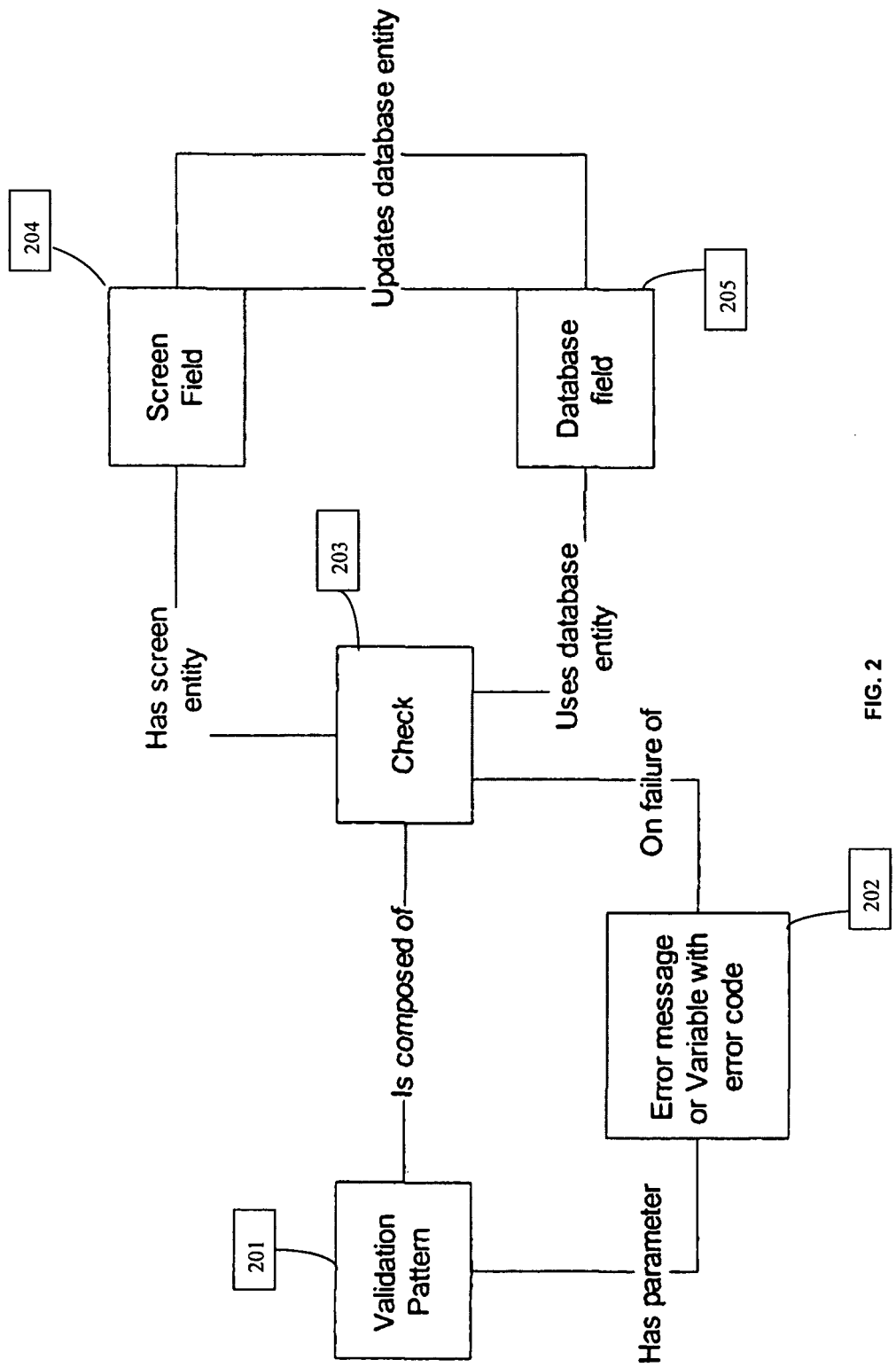

FIG. 2 describes the method and system for validation of parameters.

Figure 3:
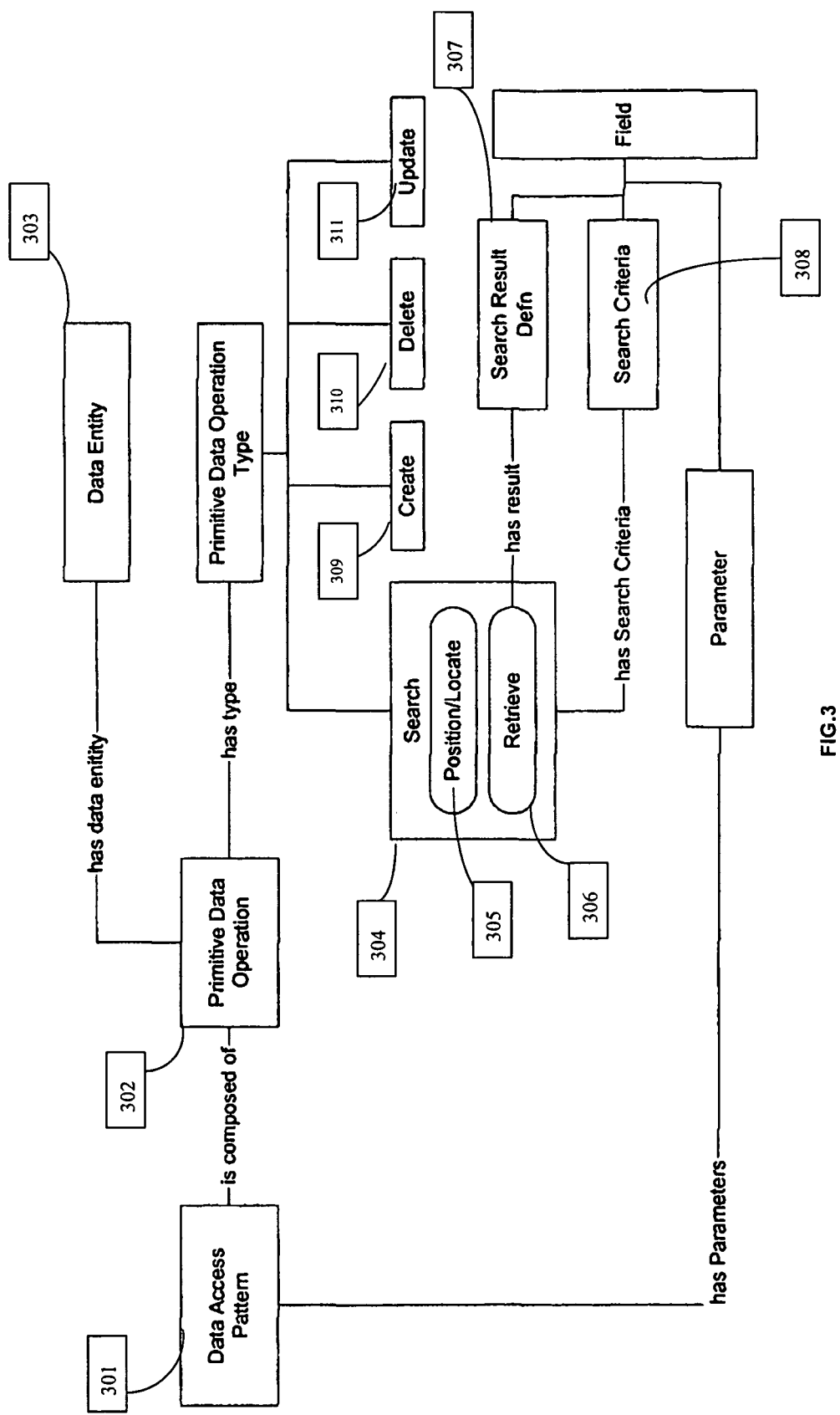

FIG. 3 describes the method and system for accessing of data patterns.

Figure 4:
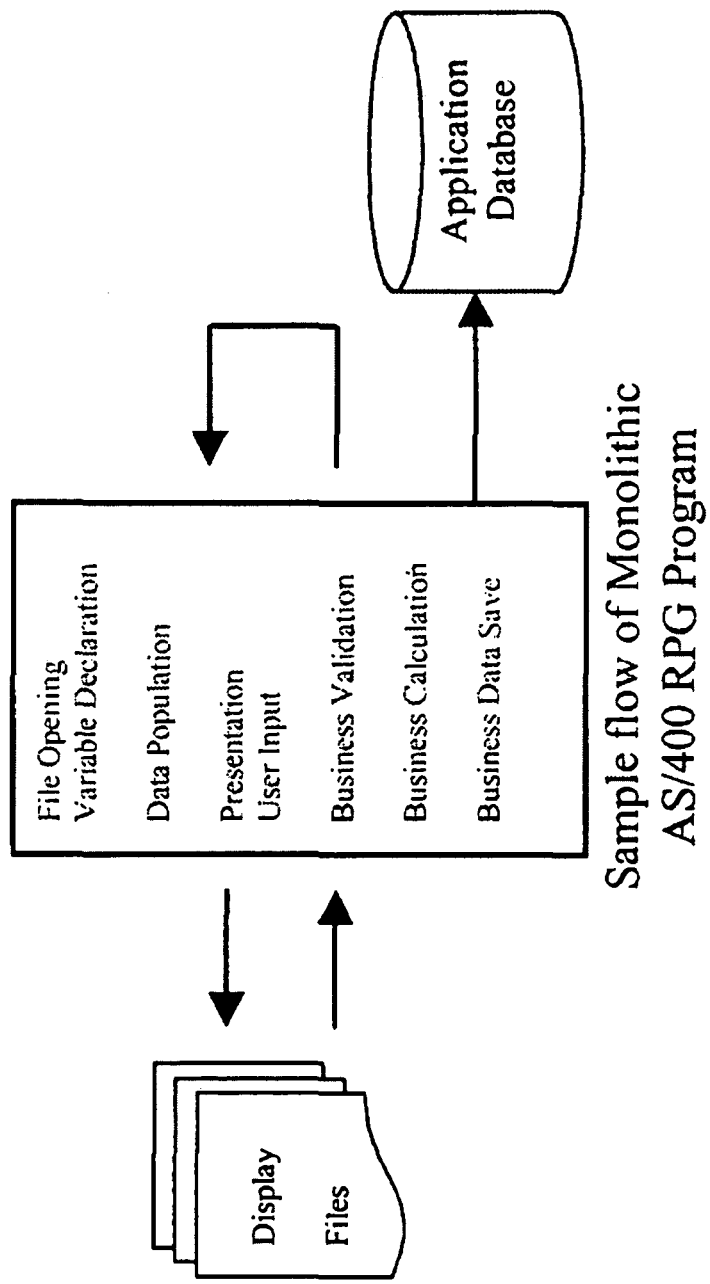
Figure 5:
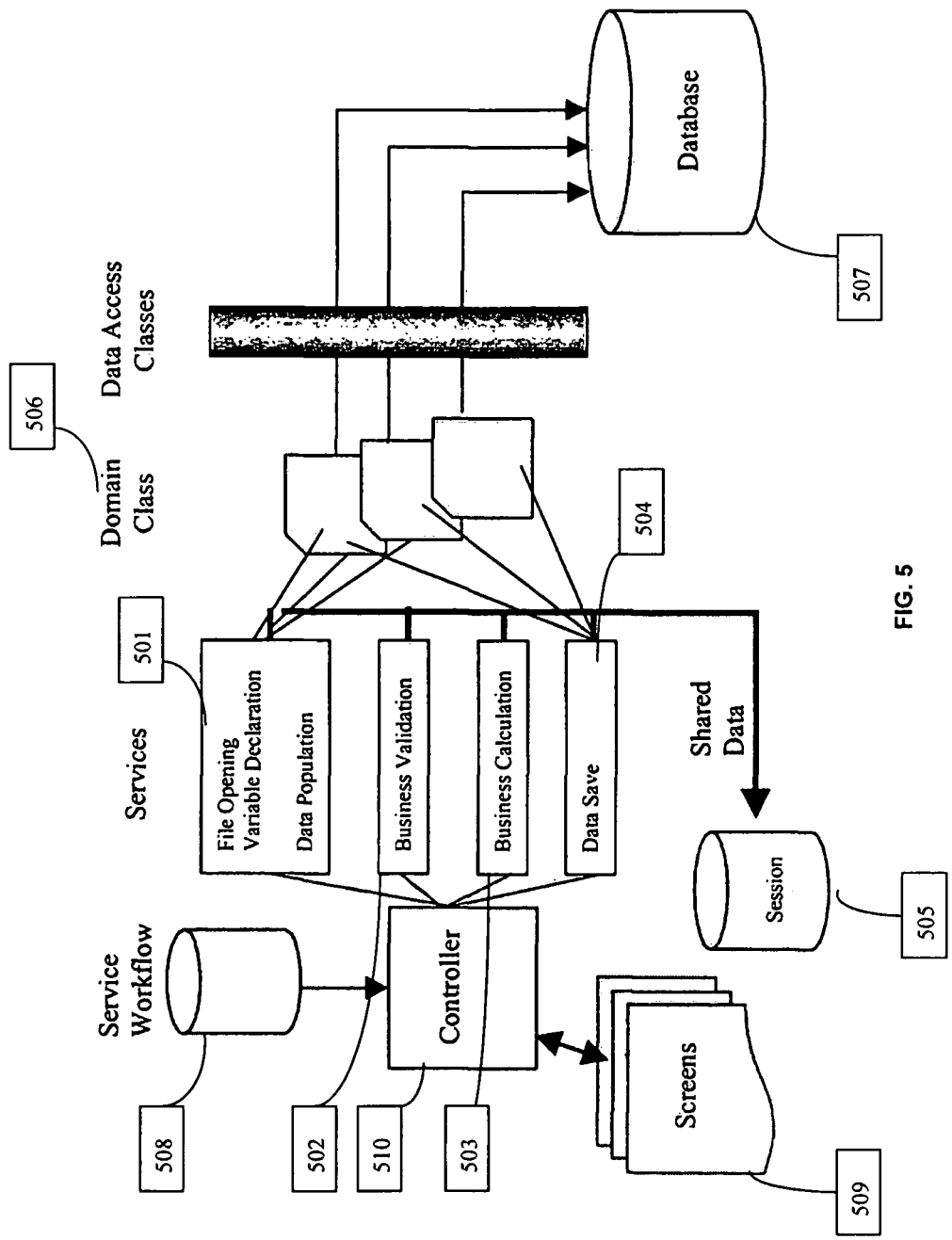

FIG. 4 and FIG. 5 show an example of AS/400 program written in RPG language that depicts how the method leads to generation of a re-architected system of modern architecture.

DETAILED DESCRIPTION OF PRESENT INVENTION

Any Legacy application (or any application for that matter) can be envisaged to have pre-defined set of logic to achieve the required functionality. Different elements of the application work together to achieve one or more than one goals required for successful execution of the application. These application elements belong to different abstractions and map to basic building blocks of an application system. Primary building blocks are user interfaces, user messages, services, validations, data access/save, and computations. There can be whole set of other building blocks such as user interface navigation, service flows, invocation of business logic, grouping of business logic etc. The present invention provides a method and system to extract different building blocks in a definitive way, transforming them by adopting the modern design patterns and styles, and re-joining these building blocks to formulate a new application that behaves as the original application.

The significant abstractions are Services, Validations, Data Access and Domains that represent the behavior of the application. There are other abstractions needed to complete the application user interfaces and data definitions, which are commonly known.

Pattern Definitions and Extraction

Based on different programming styles for an abstraction in a program, many different patterns can be defined. So there can be multiple patterns for the same abstraction. Some of the patterns are dependent on the specific features provided by the programming language while others depend on programming styles and may vary from program to program.

Variations in pattern instances can be seen as a consequence of less formally defined pattern, or more rigorous interpretation of the pattern. In either case, it adds to the challenge of automatic recognition of the pattern. To handle variations in pattern instances, pattern algorithms parameterized by domain and context information are created.

Extraction of patterns is based on the structural properties, static data-flow and control-flow analysis of the programs. We search and traverse the analysis information of programs to match the patterns, and mark the code when a match is found. Certain pieces of code may match multiple patterns, or certain patterns may have no matches.

Services

Service denotes an atomic unit of domain functionality (in case of a banking domain example services are deposit, withdraw, transfer, etc.), or it can denote a structural but cohesive unit of work (example services are populate screen, process screen, etc.). This pattern aims to segregate the code into modular blocks.

To identify services in legacy software systems, two types of service patterns are defined. Structural Services Pattern—This pattern is defined based on how program is structured to achieve a business function. The definition involves user interaction statements within a program and the control flow surrounding those statements. This pattern enables to extract the services based on the structural properties of the program.

Functional Service Pattern—This pattern is defined based on how specific program variables are taking different values and the statements getting executed for a selected value, wherein each value represents a desired business function. This pattern utilizes the preliminary program understanding in terms of identifying program variables that are used to control a particular functionality. This pattern helps extract the services based on the specific variable values in the program. Once the services are identified, the flow between services is also identified using the control flow of the legacy programs and extracted as service workflow. This information is utilized for service orchestration in the target architecture.

Validations

Validations are checks of data that comes into the application from external sources like user screen or data store or external subsystem. The checks may be edit-checks or business validations. In particular, the checks may be mandatory checks (checks to ensure non-null values), edit checks (checks to ensure valid type of data) or value checks (checks to ensure valid range of values) or table look-up checks. When the validation checks fail, error handling and error recovery is required—this is also part of validations.

FIG. 2 describes the method and system for validation of parameters.

Validation patterns (201), like other patterns, are parameterized to ensure that the pattern method can be used to capture many different types of validations. The parameters are used to specify the context—error message, data entities containing the error code, or subroutine that handles errors (202).

In the preliminary step, we identify the statements specified as parameters In the next step, we identify all the controlling checks (203) that lead to the execution of the identified statements. The controlling checks help decide the type of validation and the associated tables (if it is a table look-up check).

Next, we determine the screen fields (204) or data store fields (205) whose values are checked in the validations, and the data store fields which are updated using the values of so-identified screen-fields (204).

We then cluster a set of checks together to form a validation rule. Every validation rule is associated with one or more screen fields (204) or data store fields (205), and has associated error handling.

Data Access

Business systems are data driven and contain logic to store/retrieve information from persistent stores, such as a relational database. In most legacy applications the data access logic is tightly integrated with business logic and application programs are aware of underlying schema for the data entities. In modern applications, the data access operations are separated and implemented in a separate persistent layer. This insulates the business logic from any change in underlying schema and hence minimizes impact of such changes.

We define patterns that are used by the pattern matcher to extract data access logic from application programs. The data access patterns (301) are expressed as a combination of primitive data operations (302) on a data entity (303)—search (304), create (309), update (311) and delete (310) operation. The search operation is further classified into two types—controlling operation (locate or position) (305) and dependent operation (retrieve) (306). The search operations additionally contain specifications that make use of fields, for search criteria (308) and search results (307). Each data access pattern can have parameters that form input to the data access operation.

A data access pattern (301) consists of one or more such primitive operations (302) and a set of parameters that are expressed as fields. The order and combination of such primitive data operations determine a unique data access pattern.

Some examples of data access patterns are: check existence of a customer (locate), find all customers belonging to a particular region (locate+multiple retrieval) and retrieve billing details of a particular customer (locate+single retrieval).

Based on the specifications, different instances of the data access patterns are extracted.

Data Entity Identification

In a program, data entities are used to hold data values. Each data entity has a data type that determines the kind of data values that the entity can hold.

Legacy systems can be programmed using many possible platforms and programming languages. Elementary types like integer, float, character, string and boolean are common in many programming languages. However, the ways these types are specified and behave during runtime are different across languages or platforms. Composite types like structures and unions are also similar. Abstract data types like classes and objects are found in modern object oriented languages like C++ and Java. We identify data entities in legacy applications such that these entities hold a certain type of values. The type of values may be decided based on the usage of the data entity. The entities may be elementary or of composite type.

We define patterns to extract types of data entities from legacy applications. Elementary data types—integer, float and character are discovered based on the size of the entity. A boolean type is identified when a variable is assigned only one constant value in the program or the entity is used in condition expressions and simple assignments.

String type may be fixed-length or variable-length. Our pattern defines the type of such data entities based on the usage context. Composite types (called as record or structure in legacy programming languages) are also defined as data entities. The data entities are identified using the entity pattern matcher.

Domain Entity

An application usually accesses many data stores (example is database table) to complete its assigned task. One of the data store units that is primary to the functionality of the application is considered as the domain of the application. This is an external input provided to the re-architecting method. Such a composite type is defined as Domain entity.

Domain entity pattern is conceptualized to hold the computations and validations. It is used by services. Each program in the source legacy system has an associated domain entity which is provided as an external input to the system. We use program analysis to find out hops in program that transfer the data values from screen to the data store. For each hop, we define a domain object whose type is the corresponding domain class. The program variables participating in the hop map to the attributes of the domain object.

Service Entity

Service entity pattern is conceptualized to hold the services. The above entities are defined for re-architecting but the invention does not restrict the target architecture to have only these entities but provides flexibility to define as many types of entities as deemed appropriate and define appropriate patterns to identify the instances in the legacy system.

User Interface

User Interface definition is a pattern that includes user interface definition to paint variety of controls on the screen. All interactive software systems have methods to define the screen layout and different types of controls to be placed on screen. This information is captured in User Interface definition pattern. It is a well known pattern and is easily identifiable through knowledge of interface provided by programming language to the user interface.

User Message

User Message is a pattern that includes message to be communicated between screen and business logic. All online applications have methods to specify fields on the screen. This information is captured in User Message pattern. It is a well known pattern and is easily identifiable through knowledge of interface provided by programming language to the user interface. We define a pattern to capture the composite type of the screen-layout as a message-collection class to help communicate between the screens and the programs.

Data Definition

The Data Definition pattern defines the layout of persistent data containing layout of information in persistent storage, such as a relational database. This pattern is used to identify the persistent data entities, fields in the persistent data entity and the keys. It is a well known pattern and is easily identifiable through knowledge of interface between programming language and data store elements.

The computation pattern is defined based on the rule of elimination of other patterns.

All the above described patterns are extracted using the pattern matcher tool generated using the specification-driven workbench and stored in a repository.

Optimization of Pattern Instances

The extracted pattern instances—validations, services, user interface, data access and data definitions are optimized for the selected target architecture. This step provides the flexibility to customize the pattern instances before runtime components are generated for the target architecture.

Optimization includes but is not limited to the following steps:

Validations: Modify error messages, modify screen field association, modify domain association and remove duplicates Service workflow: Reuse existing service and refine service workflow Domain Entity: Add, modify and rename domain attributes Data access: Modify search criteria, modify search result definition User interface: Modify screen field attributes, modify screen display attributes and change action mappings (service association)

Data definitions: Rename persistent field and change field definitions The optimization step enables better control over the re-architecting process and improved quality of re-architected output due to better reuse of business logic across applications. Carrying out the optimization steps at the pattern instance level ensures better efficiency in the transformation process when compared to refactoring of runtime components (code level refactoring).

Conversion & Generation

Conversion & generation step involves generation of runtime components from optimized pattern instances for the target architecture.

Since the re-architected system is built using the object-oriented language it is important to identify relevant classes with appropriate class members which lay the foundation of the target system. Target architecture definition plays a vital role in defining the classes that should be there in the target system, though identification of these classes is done through data entity pattern matching in the source legacy system.

Classes are generated from the data entities used by the legacy system. Domain classes are generated from domain entities and service classes are generated from service entities. Message classes are generated from user message pattern to hold the data that is communicated between user interface and business logic. Persistent classes are generated from data definition pattern which are utilities to persist information in data store. Data access classes are generated from data access pattern which are utilities to interact with data stores. The data access operations are generated using SQL standards.

Class member types are converted from legacy language to object oriented language. To map the different types in legacy language which are not available in object oriented language, we introduce abstract data types in object oriented language. A library of abstract data type is created which is used during execution so that the behavior of the legacy system can be simulated in the target system.

Objects are instance of classes. Code for instantiation of objects (domain, services, user message etc.) is generated at locations closest to their first use by making use of the information given by data flow analysis. Data flow analysis is used to compute the parameters of the methods. Data-flow analysis is also used to determine variables and objects that are accessed across services and such variables are then stored and fetched from temporary data areas accessible across services. Calls to methods are introduced so that the functionality in the re-architected system is achieved.

The core business logic is encapsulated in domain class. The computations and validations are converted into different methods that are added to the appropriate domain class. In this way, domain class is constructed with attributes of the business domain as well as validation and computation methods extracted from legacy system. Based on the call hierarchy, we mark the access modifier of methods as 'private' or 'public'.

The services workflow information is externalized so that the services can be orchestrated using a generic engine. Service class provides the services by using methods of domain class.

Irrespective of the source legacy environment, target architecture can consist of distinct presentation, business logic and data access layers. The target architecture conforms to layered architecture such as MVC (Model View Controller). The user interfaces comprise the view. The service classes comprise the model. The controller orchestrates these services using the service workflow information to perform the user specified action.

Example

An example of AS/400 program written in RPG language has been taken to depict how the invented method leads to generation of a re-architected system of modern architecture as shown in FIG. 4.

In this example, the source application has presentation logic, business logic and data access logic all mixed up. The application module performs business function in a conversational mode. The application module populates data on screen, throws the screen to the user and waits for user input (conversational style). Once the user enters data on the screen the application module resumes control. It validates the user provided data. If the validation is successful, it continues to perform business calculation and updates the application database with the calculated values.

Using the described method, we can move from the code structure described above to separate the presentation layer from the core business and data access functionality. In the re-architected application for the above example, the application is separated into distinct layers. The screens (509) comprise the view. The application is broken into different services (model) and their workflow (orchestration) is externalized in a service workflow (508) XML. The controller (510) makes use of this XML and orchestrates different services to perform the user specified. In this example: one service is responsible for populating screen data (501), the second service is responsible for carrying out business validations (502), a third service is responsible for business calculation (503) and saving (504) the result to database (507). The service layer itself is a thin layer, which makes calls to methods in domain class (505) to implement the business logic. The methods in domain class (505) make calls to persistent classes to perform the data access operations, so that the domain class (505) is independent of underlying data store implementation. Any information that has to be persisted across services is shared through user session (506). User session (506) stores the current state of services for each user.

STATEMENT OF THE INVENTION

According to the present invention therefore the method of re-architecting legacy systems comprises conceptualizing the said system as a combination of plurality of pattern instances, defining patterns, specifying the said patterns into a workbench to generate plurality of pattern matchers, identifying plurality of instances of said patterns using said pattern matchers, optimizing the said instances, and transforming the said instances through conversion and generation using object-oriented language to form a re-architected system.

The patterns include, but not limiting to, services, validations, computation, data entities, data definition, data access, user interfaces and user messages.

The data entities include domain entities or service entities. These data entities are identified from the said legacy system. They are created based on domain information. The said entity is a domain entity. The service entities are created from the said legacy system. The said patterns are stored in a pattern repository, which is updated with the new patterns. The said specified patterns encompass programming language specifics and programming techniques of legacy system. The said validation pattern consists of checks on data entities that result into defined errors.

The said data access pattern consists of pre-defined sequence of native commands. The said pre-defined sequence is based on SQL (structured query language) standard.

The identified pattern instances are stored in an instance-repository, which is updated by optimization of the said pattern instances.

The said data entities generate classes in the object oriented language. These classes include domain classes and service classes. The said services, validations, computation are converted into methods of said classes using pre-defined mapping between legacy language and object oriented language.

The said computation and validation methods are added to said domain classes.

The said service methods are added to said service classes and the flow among the said service instances is identified.

The said data access, data definitions, user interfaces and user messages generate code in accordance with the re-architected system.

The legacy system is converted into layered architecture with distinct presentation, business logic and data access layers. According to the present invention, therefore it also comprises of a system of automated re-architecting of legacy systems comprising language specific parser, an analyzer, pattern matchers to identify pattern instances and converter and generator to transform the said pattern instances in the given order to form the re-architected system.

The said system performs the aforesaid method. The pattern matchers are generated by specifying the patterns into a workbench and are independent of programming languages. The said converter is generated by specifying the conversion rules into a workbench.

Detailed descriptions of the preferred embodiment are provided herein; however, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or matter.

The embodiments of the invention as described above and the methods disclosed herein will suggest further modification and alternations to those skilled in the art. Such further modifications and alterations may be made without departing from the sprit and scope of the invention, which is defined by the scope of the following claims.

INDUSTRIAL APPLICATIONS

1. It provides method to modernize legacy applications to service-oriented architecture implemented using object oriented language
2. It saves manpower and cost.
3. It provides documentation of existing business applications
4. It performs reverse engineering of applications to extract design It provides a web-based user interface to legacy systems
5. It provides transformation of file operations in legacy languages to SQL
6. It provides a flexible, cost effective solution enabling business to reduce maintenance cost, and dependency on scarce legacy skills
7. The patterns to extract various abstractions are specified and not programmed.
8. Variations in patterns can therefore be accommodated with ease.
9. It is flexible to suit to changing modern needs.
10. It is a very intellectual tool that brings about effective and efficient results.

We claim:

1. A method of re-architecting a legacy software system comprising:
   receiving, by a processor, source code of the legacy software system, wherein the legacy software system has a monolithic architecture, and wherein the source code has a plurality of pattern instances associated with a plurality of patterns, wherein the plurality of patterns comprise at least two of service patterns, validation patterns, computation patterns, data entities patterns, data definition patterns, data access patterns, user interface patterns, or user messages patterns;
   inputting the plurality of patterns into a workbench to generate a plurality of pattern matchers, wherein the workbench uses a specification language describing the plurality of patterns to generate the plurality of pattern matchers, wherein the plurality of pattern matchers correspond to the plurality of patterns;
   identifying the plurality of pattern instances in the source code using the pattern matchers, wherein the plurality of pattern instances are identified using structural properties, static data-flow analysis, control-flow analysis of the source code or a combination thereof;
   identifying code portions corresponding to the plurality of pattern instances;
   transforming the legacy software system using an object oriented language based upon
      a) the plurality of pattern instances, and
      b) the code portions corresponding to the plurality of pattern instances for re-architecting the legacy software system.

2. The method of re-architecting the legacy system of claim 1, wherein the data entities patterns include data entities, and wherein the data entities comprise domain entities or service entities.

3. The method of re-architecting the legacy system of claim 1, wherein the patterns are stored in a pattern repository.

4. The method of re-architecting the legacy system of claim 3, wherein the pattern repository is updated with new patterns.

5. The method of re-architecting the legacy system of claim 1, wherein the patterns encompass programming language specifics and programming techniques of the legacy software system.

6. The method of re-architecting the legacy system of claim 2, wherein the domain entities are created based on domain information.

7. The method of re-architecting the legacy system of claim 2, wherein the service entities are created from the legacy software system.

8. The method of re-architecting the legacy system of claim 2, wherein the validation pattern comprises checks on the domain entities that result into defined errors.

9. The method of re-architecting the legacy system of claim 1, wherein the data access pattern consists of a pre-defined sequence of native commands.

10. The method of re-architecting the legacy system of claim 9, wherein the pre-defined sequence is based on a structured query language standard.

11. The method of re-architecting the legacy system of claim 1, wherein the plurality of pattern instances are stored in an instance-repository.

12. The method of re-architecting the legacy system of claim 11, wherein the instance-repository is updated by optimization of the plurality of pattern instances.

13. The method of re-architecting the legacy system of claim 1, wherein, post re-architecting, the legacy software system is transformed into a layered architecture with distinct layers comprising a presentation layer, a business logic layer, a data access layer or a combination thereof.

14. A system for automated re-architecting of a software system, comprising:
   a memory that stores instructions;
   an electronic processor that executes the instructions to perform operations comprising:
      receiving source code of the legacy software system, wherein the legacy software system has a monolithic architecture, and wherein the source code has a plurality of pattern instances associated with a plurality of patterns, wherein the plurality of patterns comprise at least two of service patterns, validation patterns, computation patterns, data entities patterns, data definition patterns, data access patterns, user interface patterns, or user messages patterns;
      inputting the plurality of patterns into a workbench to generate a plurality of pattern matchers, wherein the workbench uses a specification language describing the plurality of patterns to generate the plurality of pattern matchers, wherein the plurality of pattern matchers correspond to the plurality of patterns;

identifying the plurality of pattern instances in the source code using the pattern matchers, wherein the plurality of pattern instances are identified using structural properties, static data-flow analysis, control-flow analysis of the source code or a combination thereof;

identifying code portions corresponding to the plurality of pattern instances;

transforming the legacy software system using an object oriented language based upon
  a) the plurality of pattern instances, and
  b) the code portions corresponding to the plurality of pattern instances for re-architecting the legacy software system.

15. The method of claim 1, wherein the transforming comprising:

generating classes for one or more pattern instances of the data entities patterns, the data definition patterns, and the services patterns, wherein the classes are one of domain classes and service classes, and wherein the classes are generated in the object oriented language; and converting the code portions corresponding to one or more pattern instances of the service patterns, the validation patterns, and the computations patterns to methods of the classes, thereby re-architecting the legacy software system into the object oriented language.

* * * * *